Figure 1:
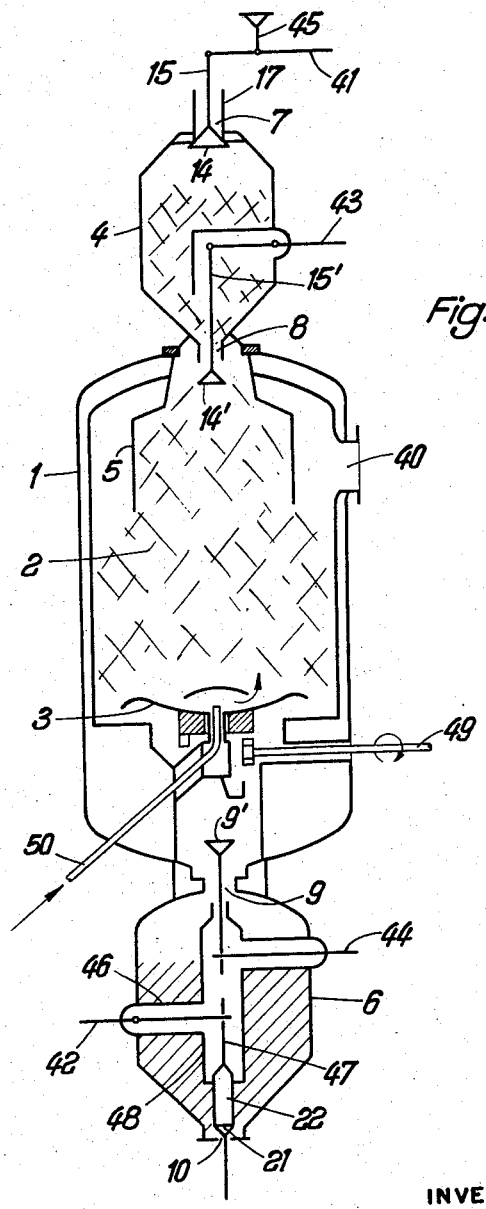

Feb. 16, 1960

R. HENZE ET AL 2,925,334

PRESSURE CLOSURE VALVE

Filed June 17, 1955

4 Sheets-Sheet 1

INVENTORS,
RUDOLF HENZE,
PAUL RUDOLPH,
FRIEDRICH DANULAT, DECEASED
BY HEDWIG GERTUDE DANULAT AND
ILSE DANULAT, ADMINISTRATORS

BY: Burgess, Dinklage & Sprung
ATTORNEYS

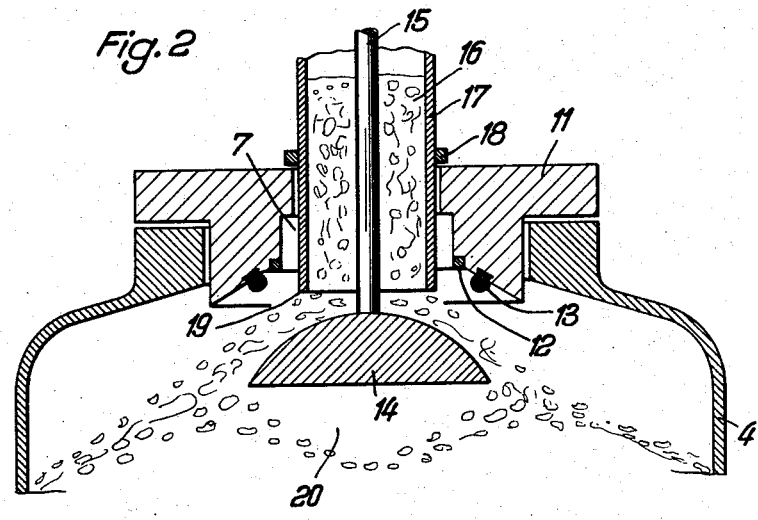
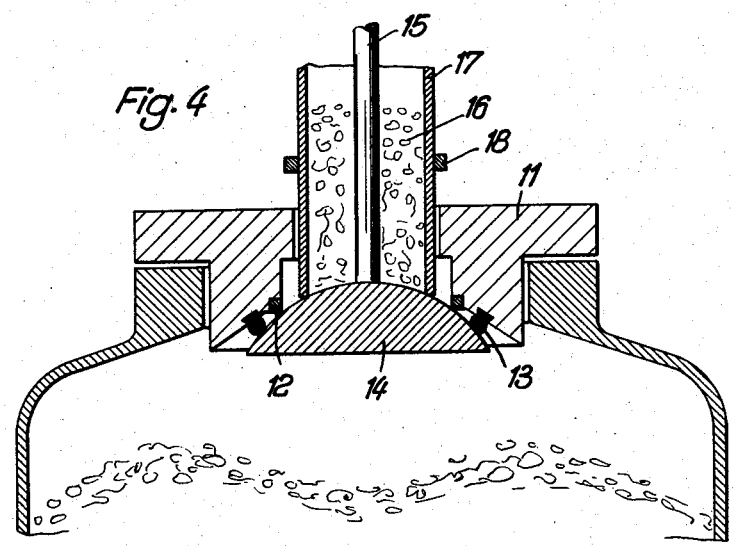

Feb. 16, 1960   R. HENZE ET AL   2,925,334
PRESSURE CLOSURE VALVE
Filed June 17, 1955   4 Sheets-Sheet 3
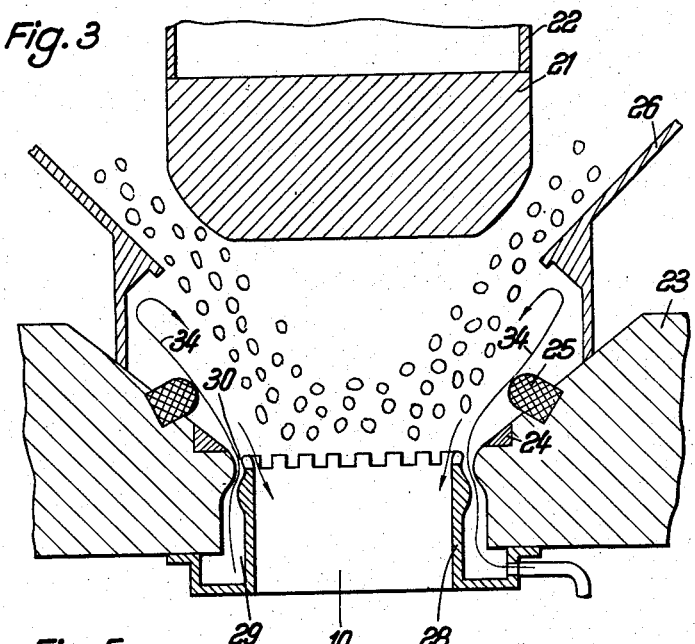
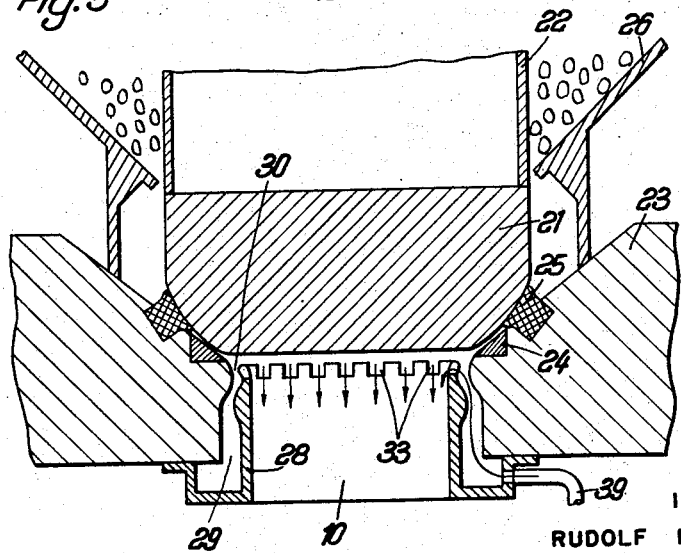
INVENTORS,
RUDOLF HENZE,
PAUL RUDOLPH,
FRIEDRICH DANULAT, DECEASED,
BY HEDWIG GERTUDE DANULAT AND
ILSE DANULAT, ADMINISTRATORS
PAUL RUDOLPH
BY: Burgess, Dinklage & Sprung
ATTORNEYS

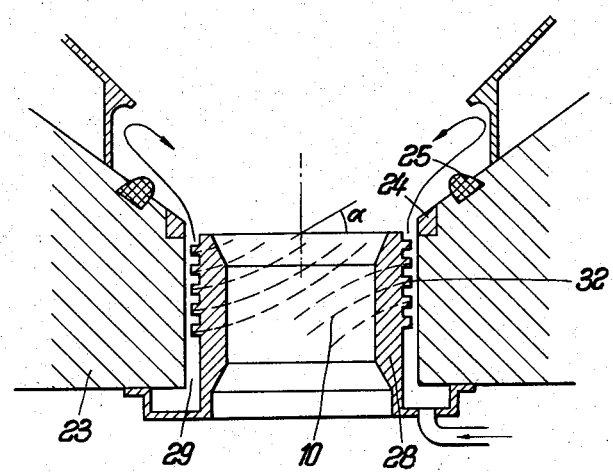
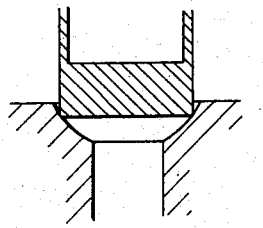
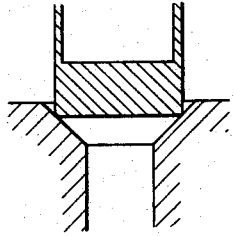

United States Patent Office

2,925,334
Patented Feb. 16, 1960

2,925,334
PRESSURE CLOSURE VALVE

Rudolf Henze and Paul Rudolph, Frankfurt am Main, and Friedrich Danulat, deceased, late of Frankfurt am Main, Germany, by Hedwig Gertrud Danulat and Ilse Danulat, administrators, Frankfurt am Main, Germany, assignors to Metallgesellschaft Aktiengesellschaft, Frankfurt am Main, Germany Application June 17, 1955, Serial No. 516,222

9 Claims. (Cl. 48—86)

This invention relates to a pressure closure valve. The invention more particularly relates to a novel pressure closure valve to be used in conjunction with pressure containers into which or from which material has to be charged or withdrawn as, for example, gas generators such as pressure gas generators.

In pressure gas generators as, for example, those which operate under a pressure of several atmospheres with oxygen and steam as the gasification media, the fuel is introduced into the generator by means of a charging lock arrangement, i.e., the fuel or coal lock, and the ash is removed by means of a discharge lock, i.e., the ash lock.

The locks consist of pressure type chambers with closure arrangements in each end, one leading from the lock chamber into the gas generator and the other leading from the lock chamber to the outside. The closure between the lock chamber and gas generator is generally constructed as a valve as, for example, having a closure member such as a conically-shaped closure member which is pressed against a metallic seat to seal the locked chamber from the interior of the gas generator.

The closure member which is used to seal the interior of the lock chamber from the outside, is generally constructed as a conventional cover or screw cap which is rendered gas-tight by means of gaskets or packing seals.

The charging lock for the fuel and the like is generally positioned at the upper portion of the generator while the discharge lock for the ash or the like is generally positioned at the bottom. In operation with the charging lock chamber filled with fuel, its upper closure leading to the outside is closed and its bottom closure leading in to the fuel generator is opened. The fuel thus flows down from the lock chamber into the gas generator. In order to re-charge the lock chamber with fuel such as coal, the bottom closure is closed and the pressure in the lock chamber is allowed to expand to atmospheric pressure. The upper closure may then be opened and the lock chamber filled with fuel. After the filling process, the upper closure is closed and the lock chamber brought to the gas generating pressure within the gas generator by means of gas, vapor, or the like, of appropriate pressure. The bottom closure is then opened to allow the fuel to pass from the lock chamber into the gas generator.

The discharge of the ash from the discharge lock is effected in a similar manner. During the filling of the discharge lock chamber, the upper closure is opened and the bottom closure, leading to the outside, is closed so that the ash removed from the grate falls into the discharge lock chamber. Removal of the ash from the lock chamber is effected after closing the upper closure, releasing the pressure in the chamber and opening the bottom closure, allowing discharge of the ash therefrom. After the removal of the ash, the bottom closure is again closed and the lock chamber is brought to the gas generator pressure by introducing gas vapor or the like. Thereafter, the upper closure is again opened, whereby the discharge chamber is again ready to receive ash from the grate.

During the operation of the gas generator, the charging of the coal and discharging of the ash, must be effected rapidly and the closures from the lock chambers, especially those leading to the outside, must effect an accurate and dependable gas-tight seal.

Although the use of covers such as screw caps in order to close the lock chambers from the outside were operationally dependable, nevertheless the use of the same was very time consuming and involved great operational expenditure.

Although many attempts have been made to design a suitable pressure valve which could be used as a gas seal, sealing the lock chambers from the outside, no satisfactory construction was ever developed and the use of the cumbersome screw caps or the like was always required.

One object of this invention is a pressure valve which may be quickly and easily operated and which may be used as a completely reliable and dependable closure member for a lock chamber of a pressure gas generator for the pressure-tight sealing thereof. This and still further objects will become apparent from the following description read in conjunction with the drawings, in which:

Fig. 1 is a diagrammatic vertical section of a pressure gas generator having charging and discharging lock chambers with embodiments of the pressure closure valves, in accordance with the invention, Fig. 2 is a vertical section showing in detail, the upper closure valve of the charging lock chamber of Fig. 1, Fig. 3 is a vertical section showing in detail, the lower pressure closure valve of the discharge lock chamber of Fig. 1, Fig. 4 is a vertical section corresponding to Fig. 2, showing the valve in the sealed position, Fig. 5 is a vertical section corresponding to Fig. 3 showing the valve in the sealed position, Fig. 6 is a vertical section showing in detail a further embodiment of a portion of a discharge opening from a discharge lock chamber, in accordance with the invention, and, Figs. 7 and 8 are vertical sections diagrammatically showing further embodiments of the valve construction in accordance with the invention.

The pressure closure valve, in accordance with the invention, which is suitable for sealing lock chambers, pressure gas generators, or other pressure chambers, has a movable closure member as, for example, with a rigid curved, spherical, flat or conical sealing surface. The valve also has a substantially rigid seat such as an annular metallic seat and a deformable elastic annular sealing element such as a gasket of butadiene-styrene copolymers, rubber, or the like. The movable closure member is movable between a position in spaced relation to the seat and sealing element and a position in contact with the seat. The sealing element is dimensioned and positioned with respect to the closure member and seat so that when the closure member is in contact with the seat, it is in pressure-tight sealing engagement with the sealing element, causing limited deformation thereof. Due to the simultaneous contact with the rigid seat, increased closing pressure on the closure member will not cause additional deformation and thus possible injury to the elastic sealing element. The contact between the movable closure member and the elastic sealing element may be so adjusted to reliably pressure seal without causing undue wear or injury to the parts.

The movable closure member is preferably so positioned with respect to the seat that the movement thereof in contact with the seat takes place in the direction of greater pressure toward lesser pressure as, for example, from the interior to the exterior, of the locks when the valve arrangement is used as the closure means sealing the lock chambers from the exterior. With this arrangement, the increased pressure in the gas generator aids in the moving to and holding the closure member in the sealed position. Further, with this embodiment and with appropriate design of the operating members, the opening of the external closure is only possible when equalization of the pressure has been produced as, for example, by releasing the excess pressure in the lock chamber. Similarly, if the valve is used for closing the lock chamber opening in communication with the interior of the pressure generator, with such a design, the opening actuation can only be effected when pressure equalization is caused by passing a compressed fluid into the lock chamber. As mentioned, any additional force on the closure member, as, for example, by the internal pressure of the gas producer, is taken up by the rigid seat and the sealing element is only loaded to the extent that it produces a reliable gas-tight seal.

The pressure valve construction in accordance with the invention, is of particular importance for use as a closure for closing the lock chambers of pressure gas generators from the outside, i.e., as the external closure means. These external closures remain closed for extended periods of time during the gas generator operation and the novel valve construction satisfies the demand for reliable pressure tightness, convenient operation, and operational dependability.

The valve construction in accordance with the invention may, of course, also be used as a closure between the lock chambers and the gas generator, i.e., the internal closures. Since, however, the internal closures are only sealed for a very short period of time during operations, slight leaks and gas losses which have occurred with the conventional devices, can be toleratad.

In accordance with a preferred embodiment of the invention, means are provided for cleaning and/or cooling the valve parts and, particularly the elastic annular sealing element during operation. These means may, for example, consist of a guide member or tube for the material being charged which will prevent this material from coming in contact with the valve seat or sealing element. Alternately or additionally, means may be provided which will blow or rinse the seat and sealing element with a suitable fluid. This blowing or rinsing may be continuously effected or in certain cases, it will suffice to effect the same shortly before the closing of the valve. The blowing or rinsing with the fluid may, furthermore, be used to effect a cooling of the sealing element as, for example, the rubber sealing ring or gasket as, for example, may be necessary when discharging hot ash. Cooling, when needed may, of course, also be separately effected.

The invention will be described in further detail with reference to the embodiments shown in the accompanying drawing:

The gas generator 1 consists of the actual gas generator shaft 2 constructed in known manner, a grate 3, with drive 49, a supply pipeline 50 for the gasification medium, a changing or inlet lock 4, which is connected to the gas generator shaft by a filling cylinder 5, and a discharge or outlet lock 6. In order to permit the passage of the fuel through the locks, the inlet lock has the openings 7 and 8, which are closable by means of suitable devices. The outlet lock can be connected to the gas generator through its opening 9 by operation of a corresponding closure device, so that the ash removed from the grate can pass into the lock chamber 6, from which it can be removed through a bottom opening 10. The closure device of the opening 10 is opened, after the opening 9 has been closed.

Figure 1 shows the operational state in which the material to be charged, for example, coal, runs down out of the inlet lock 4, which is sealed off from the outside, into the filling cylinder 5, and from there into the gas generator shaft, and in which the material to be removed, for example, ash, is introduced into the outlet lock 6, which is likewise sealed off from the outside. Reference 40 denotes the outlet for the generated gas, which can be constructed in the known manner.

The closure for the entry of the material into the lock 4 which is the fuel lock (Figs. 2 and 4) consists of a seat body 11 with a metallic seat 12, an elastic annular sealing element in the form of the rubber packing 13 and a movable closure member 14, which is connected to a rod 15 and by the latter, for example, by means of a lever mechanism, a hydraulic mechanism or similar device, can be lowered into the open position and raised into the closed position. The lever mechanism as shown, consisting of a rod 15 and a lever 41, which is movably connected to the rod and a couple 45 and a raisable and lowerable filling tube 17 is positioned in the filling opening 7.

Figure 2 shows the filling process. The material 16 to be filled slides or flows through the filling tube 17 into the lock 4. The filling tube 17 is at the same time held in its position by an arresting ring 18, which is rigidly connected thereto and which lies in this position on the seat body 11. The path of the material runs between the bottom edge 19 of the filling tube 17 and the closure member 14. The seat 12 and the packing ring 13 are protected by the filling tube from direct contact with the material passed into the sluice.

In consequence of the pouring properties of the material, a natural angle of slope occurs, commencing from the bottom edge 19 of the filling tube, so that when the lock is filled, a cavity 20 remains beneath the closure piece 14.

For the purpose of closing the upper opening 7 of the lock, the closure member 14 (Fig. 1) is moved upwardly by means of the lever 41 and of the rod 15. In the course of the lifting movement, the closure member 14 meets the bottom edge 19 of the filling tube 17 (Fig. 4), whereby further supply of the material is prevented. The filling tube is then driven upwardly by the clossure member 14. The material situated above the closure member 14 then flows into the cavity 20. The space above the closure member 14 and below the seat 12 and the packing 13 thus becomes free, whereby parts of the material are prevented from being pressed between the packing surfaces. The closure member 14 then presses against the packing ring 13, consisting for example, of rubber or some other elastic material, and then against the metallic seat 12. The seat 12 and the packing ring 13 are so disposed in relation to one another that the packing ring is compressed by the closure member 14 only to such extent as is necessary for the purpose of obtaining the sealing effect. Otherwise an excessive stressing of the packing ring would occur and would result in its rapid wear.

The force transmitted by the rod 15 from the lever 41 to the closure member 14 in many cases only produces the lifting movement. The force necessary for sealing is then caused, for example, in the case of the pressure gas generator, by the gas pressure with which the lock is charged after its filling with fuel.

By the action of the gas pressure on the packing ring 13 a force is produced which tends to deflect said ring in the direction of the pressure. For this reason the seat 12 and the packing ring 13 are so disposed in the seat body 11 and the closure member 14 is so constructed that the packing ring 13 rests between the seat body 11 and the closure member 14 on a support or bearing surface which prevents the yielding. This support or bearing surface is advantageously so constructed as, for example, in the wedge-shaped form showing that the sealing effect is not only produced by the pressure exerted by the closure piece 14 but is also improved by direct action of the gas pressure on the packing ring.

The bottom closure of the discharge lock 6 (Figs. 3 and 5) consists of the closure member or piece 21 which is connected to a hollow plunger 22 and of the seat body 23, which is disposed on the lock 6 at the bottom. The hollow plunger 22 transmits the lifting movement for the purpose of obtaining the open and closed position, for example, by a lever mechanism or a hydraulic mechanism or similar known device. A lever mechanism is illustrated. Inside the lock a box 46 is positioned (Fig. 1), which is open at the bottom and causes the lever 42 to be able to work unobstructedly in a free space. The lever 42 slides in the rod 47 which is rigidly connected to the hollow plunger 22. The hollow plunger 22 with the closure piece 21 is guided in the cylinder 48. In the seat body 23 is situated the seat 24 and the packing ring 25 (Figs. 3 and 5) made from elastic material, for example, rubber. Above the seat body is disposed a guide surface, for example, the guide plate 26. A fixed tube 28 is provided in the opening 10 at the bottom part of which tube is situated an annular passage 29 and at the upper part of which is situated the nozzle 30. This arrangement serves to accommodate and guide the medium, for example, water, for the rinsing and/or cooling of the closure or parts of the same.

In Fig. 3 the plunger 22 with the closure piece 21 is raised, i.e., in the open position. The material in the lock 6, for example, ash, can flow out or slide out. It passes with the aid of the guide plate 26 into the opening 10 and then, for example, into the open. The guide plate deflects the material from the packing ring 25 and the seat 24 and protects the packing ring and the seat from damage and similar operational disturbances. For the purpose of improving this protection, for example, in cases in which the material, for example, ash, is not in a state of constant flux during the process of removal through the lock, for example, because it is sticky and particularly when the material is hot or when hard material or material with sharp edges is passed through the lock, which material could damage the packing ring 25 when the closure means closes, rinsing and/or cooling of the seat 24 and particularly of the packing ring 25 can be effected by a fluid medium, for example, water, vapor or gas. In the example shown in Fig. 3, rinsing and cooling are jointly achieved. The medium, for example, water, enters the annular space 29 formed between the tube 28 and the seat body 23, for example, through pipeline 39, flows through the annular space and thus cools the seat body 23 and the seat 24. The water is then so guided by the nozzle 30 that it moves over the seat 24 and the packing ring 25. Thus the seat, the packing ring and its surroundings are kept clean by rinsing while at the same time a further cooling is effected. The direction of flow of the medium, for example, of the water, is altered by the guide plate 26 or similar devices and guided into the outflow direction of the material, for example, in accordance with the arrows 34, whereby further protection from contact of the material with the packing ring 25 and the seat 24 is provided and an accelerated discharge of the material achieved. By deflecting the fluid medium, for example, water, the further result is obtained that the same does not pass into the interior of the lock. If it is desired in other cases to guide the fluid medium into the lock, then this can be achieved, for example, by giving the medium the appropriate direction in the nozzle and suitably designing the guides.

Fig. 6 shows an arrangement by which projecting edges on the nozzles 30 are avoided and an even more uniform distribution of the cooling or rinsing agent, for example, the water, is achieved. Between the tube 28 and the seat body 23, the fluid is imparted a twisting motion which can be produced, for example, by means of a steep multi-turn square thread 32 on the outside of the tube 28, i.e., in the annular space 29. The fluid thus emerges at the angle α as seen from the side, and tangentially as seen from above. The angle is so chosen and the vertical position of the outlet apertures on the tube 28 are so adjusted in relation to the edge of the seat 24, that the jet obtains the desired direcion as shown by the arrows. As a result of the tangential outflow, the water jets emerging are given a twisting motion and the water is very uniformly distributed, even if a portion of the outlet apertures are clogged.

When the outlet lock has been emptied, the opening 10 is closed by lowering the closure piece 21. This lowering motion is transmitted by the lever mechanism 42, a hydraulic mechanism or similar known devices to the closure piece 21. The latter then first contacts the packing ring 25 and deformably compresses it until the member 21 is seated on the seat 24, while, similarly to the case of operation of the closure 14 of the inlet lock, the compression is effected only to such extent as is necessary for producing the gas-tight seal. In this case, too, this force is set up by the gas pressure which is produced after the cloing of the lock against the outer atmosphere, by means of gas or vapor up to gas generator pressure. The packing ring 25 can be constructed and positioned similarly to the packing ring 13.

During the closing movement, namely, shortly before its completion, the closure piece 21 comes into the region of the rinsing or cooling agent, for example, water jet or water mist, whereby it is rinsed and cooled before making contact. When the material passing through the lock 6 is hot, it may be advantageous to allow the fluid medium to continue to flow after the closing process in order to cool the closure piece and to prevent the latter from becoming heated by the material again falling into the lock and in particular, in order to prevent the packing ring becoming over-heated. In order to provide an outlet for the medium emerging through 30, slots 33 can be provided, for example, on the upper edge of the tube 28.

In the seat body 11 (Figs. 2 and 4) the seat 12 and the packing ring 13 are positioned outside the flow of the material poured and consequently the movable filling tube 17 is sufficient to protect the seat and the packing ring from premature wear. It is, however, also possible to provide in the case of this closure, a rinsing or cooling of the sealing surfaces. If desired, the closures 14' and 9' to be operated with the devices 43, 15' and 44 can also be constructed analogously to the devices shown in Figs. 2 and 6.

The closure members or pieces 14 and 21 respectively are, in Figs. 2 to 4, at their sealing surface, constructed as part of the surface of a sphere, against which the seat 12 or 24 respectively and also the packing ring 13 and 25 respectively press. In this way, a self-centering is produced. Conversely, it is also possible to construct the seat as part of a hollow ball against which a sealing edge positioned on the closure member comes in sealing contact as shown diagrammatically in Fig. 7, illustrating the bottom of closure of the ash lock. It is, however, also possible, as shown in Fig. 8, for a plate and a cone or else a plate and a plate to cooperate.

The invention can also be applied to arrangements other than gas generators. It can be used, for example, in those cases in which normal valves, slides, or similar simple closures are not applicable because the properties of the material to be supplied through a closable opening cause difficulties, for example, by rendering the closures dirty. Difficulties of this kind occur, for example, when granular solid material or liquids containing solids are to be supplied periodically or intermittently through openings which have to be closed, such as in the case of closures between absorbers, desorbers and, occasionally, drying and cooling zones, particularly in the case of continuous adsorption processes or on removal of the catalyst in catalytic processes, for example, carbon monoxide hydrogeneration, from the catalyst cycle working with fluidized or suspended contact. The invention is also applicable to devices, for example, gas generators, which operate at normal pressure, the pressing of the movable closure part against the seat in the closures according to the invention advantageously being effected by mechanical means. Moreover, it is not always necessary for the hereindescribed closure to cooperate with a second identical or different closure.

Though the invention has been described in detail with reference to the specific embodiments shown, various changes and modifications will become apparent to the artisan, which fall within the spirit of the invention and scope of the appended claims.

We claim:

1. In a pressure gas generator having a charging lock for passing fuel into the generator, a discharge lock for the removal of ashes therefrom, and separate pressure closure valves sealing the inlet to the charging lock, and the outlet from the discharging lock, the improvement which comprises at least one of said valves comprising means defining a substantially vertical passage way for the gravity flow of divided material therethrough, a substantially rigid annular seat coaxially surrounding said passage way, a deformable elastic annular sealing element of different diameter than said seat coaxially surrounding said passage way, at least a portion of said passage way defining a flow guide channel for directing material passing downwardly therethrough clear of said seat and sealing element, and movable closure member coaxially positioned with respect to said seat and sealing member and movable between an open position in spaced relationship to said seat and sealing element, and a closed position in contact with said seat, said sealing element being dimensioned and positioned with respect to said closure member and seat so that when said closure member is in contact with said seat, it is in pressure tight sealing engagement with said sealing element causing limited deformation thereof.

2. Improvement according to claim 1 in which said movable closure member is movable in a direction away from the interior of the pressure gas generator to said position in contact with said seat.

3. Improvement according to claim 2 in which said closure member has a substantially spherical surface positioned in contact with said sealing element and seat.

4. Improvement according to claim 1, in which said flow guide channel comprises a flow guide tube extending at least partially through said channel, said flow guide tube being movable between a retracted position and an extended position defining a path of flow for material passing downwardly therethrough clear of said seat and sealing member and being positioned for contact with said closure member, to be moved by said closure member, to its retracted position, when said closure member moves in contact with said seat.

5. Improvement according to claim 1, including means for passing the fluid medium over and in contact with said sealing element.

6. Improvement according to claim 5 in which said means for passing fluid medium over and in contact with said sealing element is means for passing fluid media into said valve and including deflecting means positioned for deflecting and reversing the flow of fluid media after being passed over and in contact said sealing element.

7. Improvement according to claim 6 in which said means for passing fluid media includes an annular fluid chamber with fluid discharge openings defined therethrough.

8. Improvement according to claim 7 including means for passing fluid tangentially out of said annular chamber over said sealing element.

9. Improvement according to claim 7 in which said sealing element is an annular rubber ring.

References Cited in the file of this patent

UNITED STATES PATENTS

| 845,244 | Lorenz | Feb. 26, 1907 |
| 1,720,673 | Gnoble | July 16, 1929 |
| 1,966,264 | Roye | July 10, 1934 |
| 2,155,927 | Boynton | Apr. 25, 1939 |
| 2,200,488 | Clemmitt et al. | May 14, 1940 |
| 2,388,941 | Wehr | Nov. 13, 1945 |
| 2,485,092 | Gannon | Oct. 18, 1949 |

FOREIGN PATENTS

| 6,518 | Great Britain | Mar. 20, 1903 |
| 1,063,040 | France | Dec. 16, 1953 |